US006816504B1

(12) United States Patent
Erickson

(10) Patent No.: US 6,816,504 B1
(45) Date of Patent: Nov. 9, 2004

(54) METHOD AND APPARATUS FOR TRANSFERRING DETERMINISTIC LATENCY PACKETS IN A RINGLET

(75) Inventor: Marc David Erickson, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/191,157

(22) Filed: Nov. 13, 1998

Related U.S. Application Data

(63) Continuation of application No. 08/810,626, filed on Feb. 28, 1997, now Pat. No. 5,896,384.

(51) Int. Cl.[7] .............................................. H04L 12/40
(52) U.S. Cl. ........................ 370/452; 370/517; 375/372
(58) Field of Search ................................ 370/452, 517, 370/403, 404, 405, 412, 429, 428, 221, 222, 223, 224, 230, 235, 258, 456, 421, 451, 463, 516, 519; 375/371, 372

(56) References Cited

U.S. PATENT DOCUMENTS

| | | | |
|---|---|---|---|
| 4,365,112 A | * | 12/1982 | Ruether |
| 4,500,987 A | | 2/1985 | Hasegawa |
| 4,528,661 A | | 7/1985 | Bahr et al. |
| 4,845,709 A | | 7/1989 | Matsumoto et al. |
| 5,124,984 A | | 6/1992 | Engel |
| 5,235,595 A | | 8/1993 | O'Dowd |
| 5,341,374 A | | 8/1994 | Lewen et al. |
| 5,428,649 A | | 6/1995 | Cecchi |
| 5,590,366 A | | 12/1996 | Bryant et al. |
| 5,684,791 A | * | 11/1997 | Raychaudhuri et al. ..... 370/278 |
| 5,768,544 A | | 6/1998 | Hauck |
| 5,931,926 A | * | 8/1999 | Yeung et al. .................. 710/52 |
| 6,370,125 B1 | * | 4/2002 | Belk ........................... 370/312 |

OTHER PUBLICATIONS

"International Standard: Information technology—Microprocessor systems—Control and Status Registers (CSR) Architecture for microcomputer buses," ISO/IEC, et al., Oct. 5, 1995, pp. 41–45, and title page.

"Serial Express—A Scalable Gigabit Extension to Serial Bus," IEEE, Inc., Sep. 23, 1996, pp. 9–10, 32, 91, and title page.

U.S. patent application Ser. No. 08/721,269, Hauck, filed Sep. 26, 1996.

* cited by examiner

*Primary Examiner*—Kenneth Vanderpuye
(74) *Attorney, Agent, or Firm*—Ted A. Crawford

(57) ABSTRACT

Briefly, in accordance with one embodiment of the invention, a method of using a bypass buffer in a node coupled to a ringlet includes the steps of: writing a packet of binary digital signals on the ringlet into the bypass buffer; and retaining the packet of binary digital signals in the bypass buffer for a predetermined amount of time before transferring the packet to the ringlet.

Briefly, in accordance with another embodiment, a node to be coupled to a ringlet includes: a transmit buffer and a receive buffer. The transmit and receive buffers are coupled in a configuration to transfer binary digital signals between the node and the ringlet via the transmit and receive buffers. The configuration further includes a bypass buffer to temporarily queue binary digital signals passing through the node. The bypass buffer is further coupled in the configuration to retain a packet of binary digital signals for a predetermined amount of time before transferring the packet to the ringlet.

Briefly, in accordance with yet one more embodiment, a node to be coupled to a ringlet includes a bypass buffer. The bypass buffer is able to be coupled to the ringlet to temporarily queue data signals from the ringlet. Digital logic circuitry coupled to the bypass buffer includes a head pointer for the bypass buffer. The bypass buffer is coupled to the head pointer to retain a packet of data signals for a predetermined amount of time before transferring the packet to the ringlet.

13 Claims, 7 Drawing Sheets

METHOD AND APPARATUS FOR TRANSFERRING DETERMINISTIC LATENCY PACKETS IN A RINGLET

RELATED APPLICATIONS

This patent application is a continuation patent application of U.S. patent application Ser. No. 08/810,626, entitled "Method and Apparatus for Transferring Deterministic Latency Packets in a Ringlet," by M. D. Erickson, filed on Feb. 28, 1997 now U.S. Pat. No. 5,896,384.

The present invention is related to co-pending U.S. patent application Ser. No. 08/721,269, entitled "Deterministic Latency Characterization and Mitigation," by Jerrold V. Hauck, filed Sep. 26, 1996, assigned to the assignee of the present invention, and herein incorporated by reference.

BACKGROUND OF THE INVENTION

1. Field of the Invention

The present invention relates to ringlets and, more particularly, to a method of achieving deterministic latency for packets in a ringlet

2. Background Information

Ringlets lack the ability to broadcast information at the same time to all devices or nodes coupled to the ringlet. Information in the form of electrical signals is passed around the ringlet from one device or node to another in a sequential fashion. Because a ringlet may have more than one device or node simultaneously transferring information to the ringlet, there is a large random component to the delay of the delivery of information in the form of electronic signals from one device or node to another.

Typically, the transmitting node includes a fixed size storage unit or buffer having memory locations to store incoming signals. Typically, the size of this storage buffer is chosen to match the largest amount of time that the node could be transferring its own data to the ringlet while simultaneously receiving data from a previous node coupled to the ringlet. However, the node could originate different amounts of information at different times and the relationship between when the incoming data is arriving and when a node is originating data is not fixed. A need therefore exists for an approach to ringlets that addresses these problems.

SUMMARY OF THE INVENTION

Briefly, in accordance with one embodiment of the invention, a method of using a bypass buffer in a node coupled to a ringlet includes the steps of: writing a packet of binary digital signals on the ringlet into the bypass buffer; and retaining the packet of binary digital signals in the bypass buffer for a predetermined amount of time before transferring the packet to the ringlet.

Briefly, in accordance with another embodiment, a node to be coupled to a ringlet includes: a transmit buffer and a receive buffer. The transmit and receive buffers are coupled in a configuration to transfer binary digital signals between the node and the ringlet via the transmit and receive buffers. The configuration further includes a bypass buffer to temporarily queue binary digital signals passing through the node. The bypass buffer is further coupled in the configuration to retain a packet of binary digital signals for a predetermined amount of time before transferring the packet to the ringlet.

Briefly, in accordance with yet one more embodiment, a node to be coupled to a ringlet includes a bypass buffer. The bypass buffer is able to be coupled to the ringlet to temporarily queue data signals from the ringlet. Digital logic circuitry coupled to the bypass buffer includes a head pointer for the bypass buffer. The bypass buffer is coupled to the head pointer to retain a packet of data signals for a predetermined amount of time before transferring the packet to the ringlet.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

Figure 1:
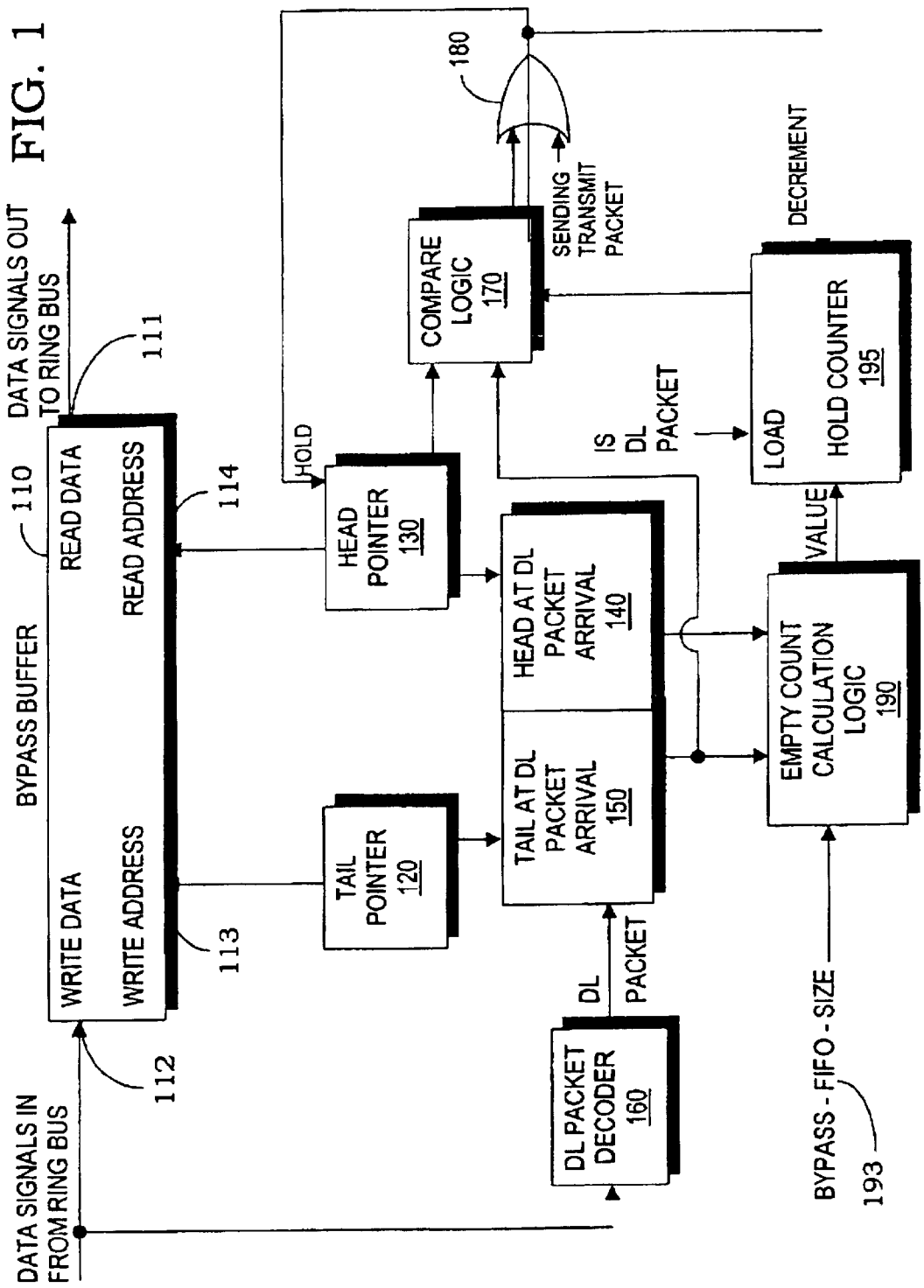
FIG. 1 is a schematic diagram illustrating an embodiment of an apparatus for transferring deterministic latency packets in a ringlet in accordance with the invention.

In the following detailed description numerous specific details are set forth in order to provide a thorough understanding of the present invention. However, it will be understood by those skilled in the art that the present invention may be practiced without these specific details. In other instances, well-known methods, procedures, components, and circuits have not been described in detail so as not to obscure the present invention.

Some portions of the detailed description which follow are presented in terms of algorithms and symbolic representations of operations on data bits or binary digital signals within a computer memory. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing terms such as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

As previously indicated, for a ringlet, there is typically a large random component to the delay of the delivery of information in the form of electronic signals from one device or node to another. This random delay is due, at least in part, to a transmitting node delaying the transfer of information to the ringlet that the transmitting node is receiving from another node until the transmitting node is done transferring its own information to the ringlet. Since a node coupled to the ringlet may originate different amounts of signal information at different times and the relationship between when the incoming data signals are arriving and when a node is originating data signals is not fixed, the storage buffer previously described of the node may not be fully utilized at any given time. Thus, due, at least in part, to this partial buffer utilization, the incoming information in the form of electronic signals undergoes a nondeterministic delay through the storage buffer of the node.

For an embodiment in accordance with the invention, it is desirable to allow for a fixed delay in delivering information in the form of electrical signals from one node to another. An embodiment in accordance with the present invention allows information in the form of electrical signals to be passed from one node to another in a ringlet with a fixed or deterministic latency. In this context, a ringlet refers to a closed curve configuration of links or paths for electromagnetic signals in which the links or paths are point-to-point and independent so that different signals may be simultaneously transferred over different links in the ringlet. In addition to an advantage of predictability, an embodiment in accordance with the invention simplifies prior specified methods of distributing a global time-of-day value across a ringlet system or topology, as will be explained in more detail. See, for example, "Control and Status Registers (CSR) Architecture for Microcomputer Ringlets", ANSI (American National Standard Institute)/IEEE (Institute of Electrical and Electronics Engineers) Standard 1212, Sec. 6.4 (1994). In brief, IEEE standard 1212 has each device measure how long the time-of-day information took to get through the device and update the time-of-day value to reflect this delay. For an embodiment in accordance with the invention, no measurement is employed because the delay through the node will be a fixed, known value.

Related to the previously stated advantage, an embodiment in accordance with the present invention allows the random component of information delivery delay to become a deterministic delay. Therefore, an application that employs information in the form of electrical signals to be delivered with a known latency to its destination, not just time-of-day values, may do so. One such application for example, without limitation, may include a disk drive. A packet having a deterministic latency as it traverses a ringlet would reduce the need for data buffering. This may be accomplished for a disk drive, for example, by ensuring that requests for data signals from another device or node are made in advance to match the known delivery delay such that the signals arrive just as the physical placement of the disk drive read/write head is complete, as described in more detail hereinafter.

An aspect of the invention is to exploit the fixed size of the storage buffer associated with the node and used to hold packets passing through the node. In this context, this is referred to as the "holding buffer" or "bypass buffer". In an embodiment in accordance with the invention, an incoming packet of binary digital signals or bits may be delayed due to the full size of the holding buffer, regardless of the buffer's utilization at the time the incoming signals arrive. When information in the form of electrical signals arrives that is sensitive to the random delay of the holding buffer or bypass buffer, the device will determine the amount of space left in the buffer. Whether the device or node is originating signals or not, the incoming signals will be held long enough such that the buffer may become fully utilized. When enough time has passed that the holding or bypass buffer may have reached a full state, an incoming packet of binary digital signals which has been stored in the buffer is allowed to pass through to the next device or node in the ringlet.

Figure 2:
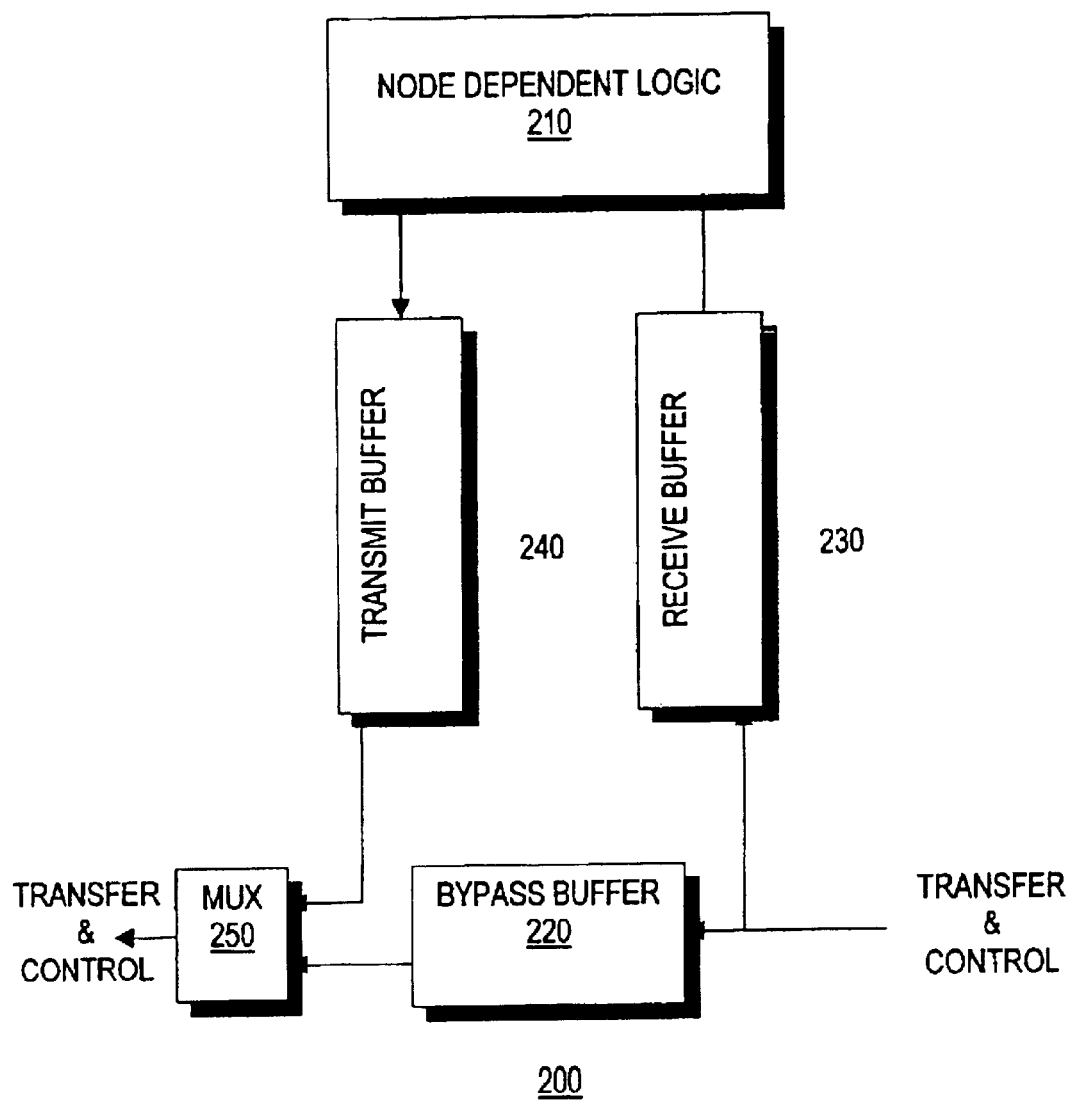
FIG. 2 is a schematic diagram illustrating one example of a node for a ringlet.

FIG. 2 is a schematic diagram illustrating an embodiment 200 of one example of a node that is capable of being coupled to a ringlet. See, for example, "Serial Express-A Scaleable Gigabit Extension to Serial Ringlet," Draft 0.70, dated Sep. 23, 1996, available from the Institute of Electrical and Electronics Engineers (IEEE), herein incorporated by reference. It will, of course, be appreciated that the invention is not restricted in scope to a node having this particular configuration. Node dependent logic 210 may comprise, for example, without limitation, a camera, a personal computer (PC) host, a disk drive or a digital monitor. Likewise, as illustrated, embodiment 200 includes a transmit buffer 240, a receive buffer 230, a bypass buffer 220, and a multiplexer (MUX) 250. A node, therefore, may include a transmit buffer, a receive buffer, and a bypass buffer, as illustrated in FIG. 2, although the invention is not limited in scope in this respect. In this particular embodiment, bypass buffer 220 comprises a first-in, first-out (FIFO) bypass buffer that includes a wrap-around capability, although again the invention is not limited in scope in this respect. Incoming packets of binary digital signals are sometimes copied into the receive buffer. For "Serial Express," for example, an ignore/copy decision may be based on the first four bytes of the packet, although the invention is not limited in scope in this respect. A copy decision may occur for a multicast packet. Packets may either pass through the node or may be stripped (converted into idles). In this context, stripping refers to the process where the packet is pulled from the ringlet. Likewise, the term idle refers to uniquely identifiable, non-packet signals that may be transferred between packets. For "Serial Express," for example, this pass/strip decision is based on comparing the packet's first two bytes to the node's identifiers. The node dependent logic is responsible for creating packets and placing them within the transmit buffer.

Simple nodes may delay their packet transmissions until an entire packet has been placed in its transmit buffer to account for slower variable packet creation rates. Higher performance nodes may pipeline the transmit buffer updates among the transmissions while the buffer is being filled. Under light loading conditions, a packet may be transmitted immediately after an idle passes through the node. However, if a pass through packet B is received during a packet A transmission, packet B is temporarily queued in the bypass buffer. See, the previously referenced "Serial-Express-A Scaleable Gigabit Extension to Serial Ringlet," Section 1.5.3. After packet A has been transmitted, the bypass buffer contents are routed to the output port of the node and packet B continues towards its destination. However, with the benefit of the present invention, packet B may instead be retained in the bypass buffer, as explained in more detail hereinafter.

FIG. 1 illustrates an embodiment 100 of a bypass buffer including ringlet transfer logic in accordance with the invention. Embodiment 100 includes bypass buffer 110. Bypass buffer 110 includes port 112 for writing data signals received from a prior node coupled to the ringlet into the bypass buffer and port 113 for addressing the memory locations of those signals in the buffer. Likewise, bypass buffer 110 includes port 111 for reading data signals out of the buffer so that they may be transferred to the ringlet, such as via a MUX, for example, and port 114 for addressing the memory locations of those signals in the buffer. Likewise, embodiment 100 includes a head pointer 130 and a tail pointer 120. Although the operation of these pointers will be described in greater detail hereinafter, they indicate the memory locations of the head and tail of the contents of the buffer at a given time or on a particular clock cycle of a synchronizing clock driving the circuitry. Likewise, embodiment 100 includes register 150 for storing the memory location indicated by the tail pointer for buffer 110 when a deterministic latency (DL) packet arrives and register 140 for storing the memory location indicated by the head pointer for buffer 110 when a deterministic latency (DL) packet arrives. In this context, a deterministic latency packet refers to a packet in which the delay or latency of the packet through a node coupled to the ringlet is a fixed period of times. Typically, such packets will include an identifier to indicate their status as DL packets, such as in the packet header, for example. Typically, such packets also have some aspect of time sensitivity associated with them. Registers 140 and 150 point to "empty count calculation" logic 190. Of course, in an alternative embodiment, signals for the head pointer and tail pointer may be provided to logic, such as 190, without intermediate storage in registers, such as 140 and 150. In this context the term "empty memory location" refers to a memory location that is not storing useful data in the form of a binary digital signal or bit to be transferred to the ringlet or elsewhere in the node. Likewise, although in this context idles may be considered useful or useable signal data, depending upon the particular embodiment, idles may or may not be transferred to the bypass buffer. In this particular embodiment, empty count calculation logic 190 represents combinatorial logic, and is also pointed to by BYPASS-FIFO-SIZE 193. In this embodiment, BYPASS-FIFO-SIZE 193 represents the size of the bypass buffer in terms of memory locations.

At the time a deterministic latency packet arrives, such as on a particular clock cycle of a synchronizing clock driving the circuitry, this is indicated by DL packet decoder 160. This logic unit points to register 150 which stores the tail memory location indicated by the tail pointer at the time the deterministic latency packet arrives and to register 140 which stores the head memory location indicated by the head pointer at the time the deterministic latency packet arrives. For example, as previously suggested, a deterministic latency packet may be indicated by a particular header on the packet and decoded by unit 160, although the invention is not limited in scope in this respect. The signals stored in registers 140 and 150 as well as the size of the bypass buffer are provided to 190. In general, it is desirable to calculate the size of the bypass buffer reduced by the number of memory locations with valid data signals. In this particular embodiment, 190 performs a calculation in accordance with the following relation:

If Reg 140>Reg 150,

Hold Counter Value=SIZE−[(Reg 150+SIZE)−Reg 140+1]      [1a]

If Reg 140<Reg 150,

Hold Counter Value=SIZE−[(Reg 150−Reg 140)+1]      [1b]

where, for this relation SIZE represents the size of the bypass buffer in terms of memory locations, Reg 150 stores the tail memory location when the DL packet arrives, and Reg 140 stores the head memory location when the DL packet arrives. It is, of course, assumed that the memory location addresses are numbered sequentially.

The previous calculation essentially provides the number of memory locations of the bypass buffer that are empty at the time a DL packet arrives. Assume in this particular embodiment that data signals may be written to or read from the buffer on each clock pulse or cycle of a synchronizing clock, although the invention is not limited in scope in this respect. The empty count calculation, therefore, provides information regarding how long to wait before transmitting the deterministic latency packet to ensure that the packet has a fixed or deterministic latency. Of course, this approach may be adjusted for alternative embodiments employing different clock timing. In this case, the fixed latency comprises the size of the bypass buffer, although, again, the invention is not limited in scope in this respect. In this particular embodiment, head pointer 130 points to the last memory location from which data signals have been read out of the bypass buffer. Likewise, tail pointer 120 points to the last memory location in which data signals have been written into the bypass buffer.

Due to the operation of the bypass buffer obtaining packets of binary digital signals via port 112, including deterministic latency packets, at some point head pointer 130 will point to the beginning of a deterministic latency packet. However, at that point, the accumulated delay or the number of clock cycles in which the deterministic latency packet has been in the bypass buffer, may be less than the fixed delay desired for a deterministic latency packet. This represents a situation in which the empty count calculation provided by 190 as well as other circuitry shown in embodiment 100 may be employed to ensure that a fixed delay of the appropriate period of time has passed before the deterministic latency packet is read from the bypass buffer. Of course, the invention is not restricted in scope to this particular embodiment.

More specifically, again, assuming the previous contents of the bypass buffer have been read out at the rate of a bit per clock pulse, empty count calculation 190 computes the amount of time, in terms of clock cycles or pulses in this embodiment, that a deterministic latency packet should be held or retained in the bypass buffer before transferring the packet to the ringlet to ensure that the deterministic latency packet has a fixed delay, such as equal to the size of the bypass buffer in terms of clock cycles in this embodiment. As indicated in FIG. 1, the empty count value is provided to hold counter 195 and loaded.

As illustrated in FIG. 1, logic 170 performs a number of compare operations. Logic 170 compares the memory location indicated by the tail pointer at the time a deterministic latency packet arrives with the current memory location indicated by the head pointer. A reason for this comparison is because when these are equal, it indicates that the head pointer is now indicating a memory location from which to begin to read the deterministic latency packet out of the buffer. However, because the desired fixed amount of time may not have passed before this occurs, it may be desirable to prevent the deterministic latency packet from being read from the bypass buffer for an additional amount of time, in this embodiment determined by the empty count that has been written into hold counter 195. Thus, in this situation, logic 170 provides a signal to gate 180 resulting in a hold signal so that head pointer 130 continues to indicate the current memory location as clock cycles continue. At the same time hold counter 195 is decremented on each clock cycle. Likewise, the current value of the hold counter is provided to logic 170. Thus, a loop continues for enough clock cycles until the current value of the hold counter reaches zero. At that point, the deterministic latency packet has been held in the bypass buffer for a desired fixed amount of time and logic 170 indicates that the DL packet may now be read from the bypass buffer in the usual fashion by no longer providing a hold signal to head pointer 130.

It is, likewise, noted that a possible input signal to OR gate 180 includes a signal indicating that a transmit packet is being transferred from the transmit buffer to the ringlet. When a transmit packet is transferred from the transmit buffer, this also acts as a delay in which the deterministic latency packet is held in the bypass buffer because both buffers cannot transfer signals to the ringlet during the same clock cycle. Therefore, during this period of transmission, the hold counter is also decremented and the head pointer is put on "hold", as will be explained in more detail hereinafter.

Figure 3A:
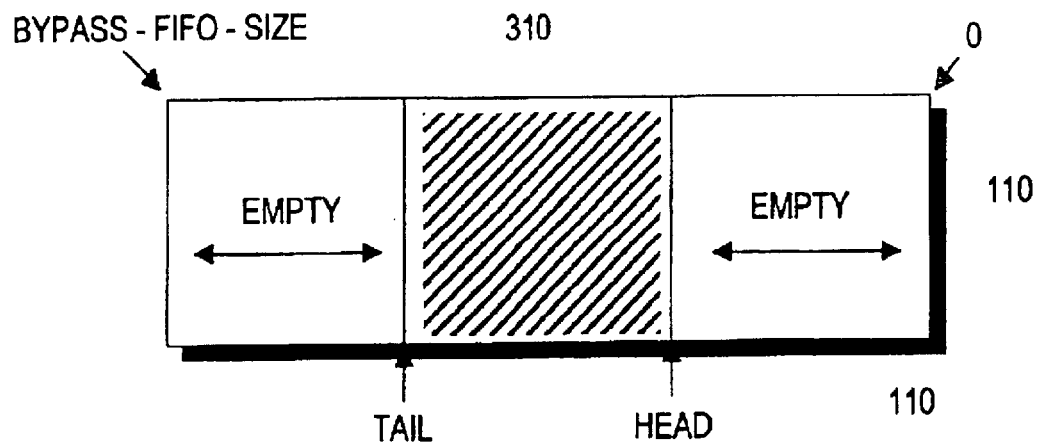
FIGS. 3A, 3B, 4A, 4B, 5A, 5B, 5C, and 5D are schematic diagrams illustrating the contents of a bypass buffer at various times during the operation of an embodiment of an apparatus for transferring deterministic latency packets in a ringlet in accordance with the invention.

The operation of an embodiment of a bypass buffer in accordance with the invention shall now be described with reference to FIGS. 3, 4 and 5. FIG. 3A illustrates an embodiment 110 of a bypass buffer in which a deterministic latency packet is about to arrive. As illustrated in FIG. 3A, this buffer has memory locations beginning with zero and ending with BYPASS-FIFO-SIZE, although, of course, the invention is not restricted in scope to this particular memory location numbering system. In this particular embodiment, the bypass buffer is a wrap-around buffer. Likewise, illustrated in FIG. 3A is an empty portion and a portion designated 310 which contains packets of binary digital signals. Likewise, FIG. 3A also illustrates the location indicated by the head pointer and the location indicated by the tail pointer with respect to packets 310.

Figure 3B:
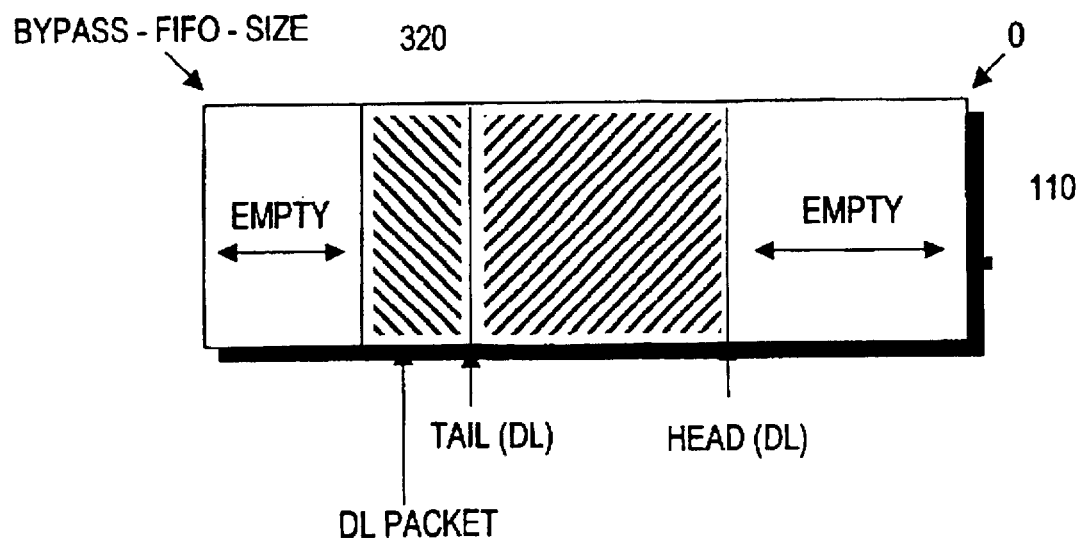

FIG. 3B illustrates bypass buffer 110 once a deterministic latency (DL) packet has arrived. In FIG. 3B, the DL packet is designated 320. Again, the size of the bypass buffer is provided as BYPASS-FIFO-SIZE. Likewise, the locations indicated by the head pointer and the tail pointer at the time of the arrival of the DL packet are stored. As previously discussed, with respect to the embodiment illustrated in FIG. 1, these values are stored in registers 150 and 140, respectively. In this particular embodiment, logic 190 now has enough information to perform a calculation in accordance with relation [1].

One aspect of an embodiment in accordance with the invention is whether the deterministic latency packet arrives when the bypass buffer is in "flow-through mode" or "hold mode". These modes will now described in greater detail. In this context, the term "flow-through mode" refers to a situation in which the bypass buffer is transferring stored binary digital signals to the ringlet. In contrast, "hold mode" refers to a situation in which the bypass buffer is not transferring stored binary digital signals to the ringlet. In such a situation, typically then, the previously described transmit buffer would be transferring binary digital signals to the ringlet instead.

Figure 4A:
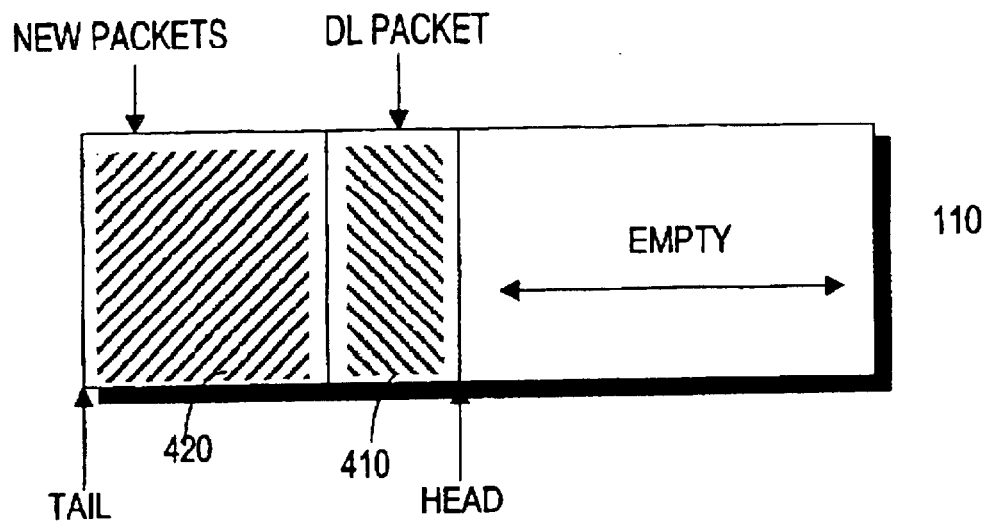
Figure 4B:
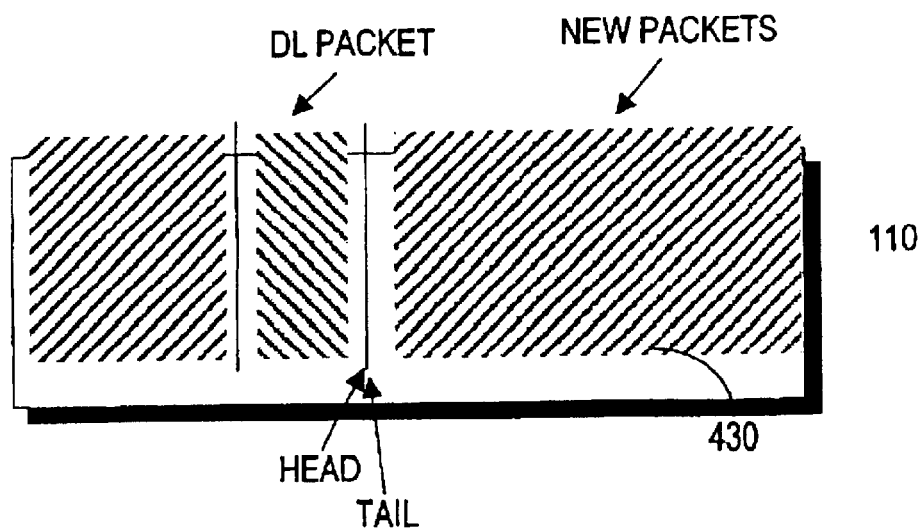

Assume the bypass buffer is in flow-through mode when a deterministic latency packet arrives. After a number of clock cycles or pulses given by the equation below:

$$T\text{flow-through}_{DL} = \text{tail}_{DL} - \text{head}_{DL} \qquad [2]$$

where $\text{tail}_{DL}$ is the contents of register 150 and $\text{head}_{DL}$ is the contents of register 140, the deterministic latency packet is at the head of the bypass buffer. That is, the head pointer points to the memory location storing the beginning of the deterministic latency packet. This situation is illustrated by FIG. 4A. Likewise, FIG. 4A illustrates that after the arrival of a deterministic latency packet, new packets, designated 420 in FIG. 4A, may continue to arrive. When the deterministic latency packet is at the head of the bypass buffer, the bypass buffer is then put in "hold mode". As illustrated in FIG. 4A, the bypass buffer at this point may not be fully utilized. Once in hold mode, the hold counter is decremented until the counter reaches zero at which point the bypass buffer is full, as illustrated in FIG. 4B. It is noted, of course, that the buffer may not fill up, such as if binary digital signals or bits are not received during each pulse of the counter, for example. Once the counter reaches zero, the bypass buffer is put back in "flow-through mode" and the deterministic latency packet is transmitted. Therefore, the deterministic latency packet will have been transmitted after a fixed period of latency, as desired.

Figure 5A:
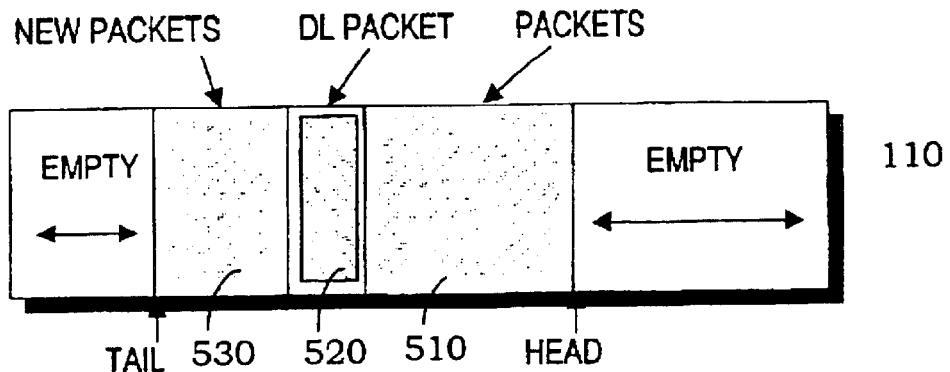
Figure 5B:
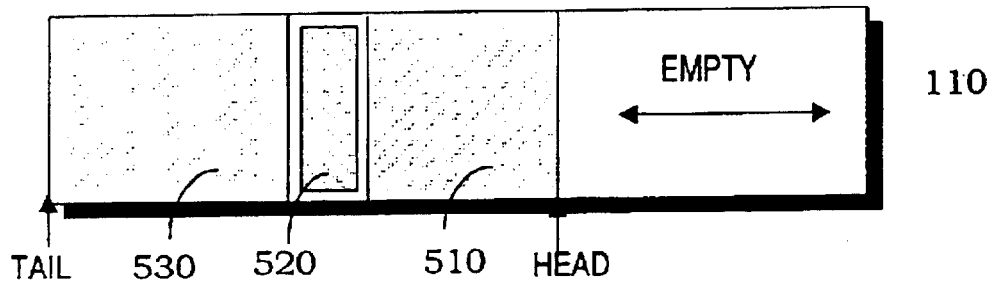
Figure 5C:
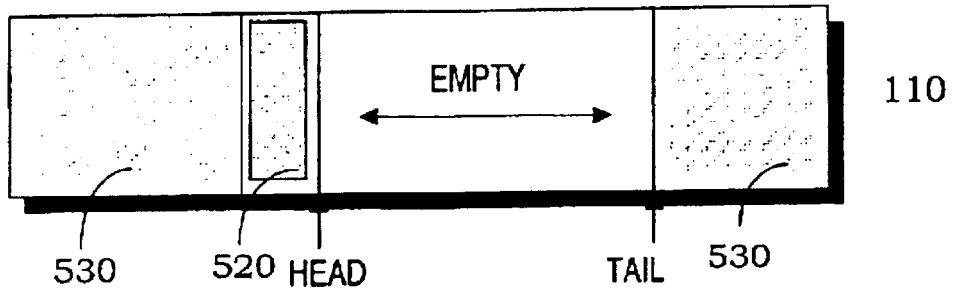
Figure 5D:
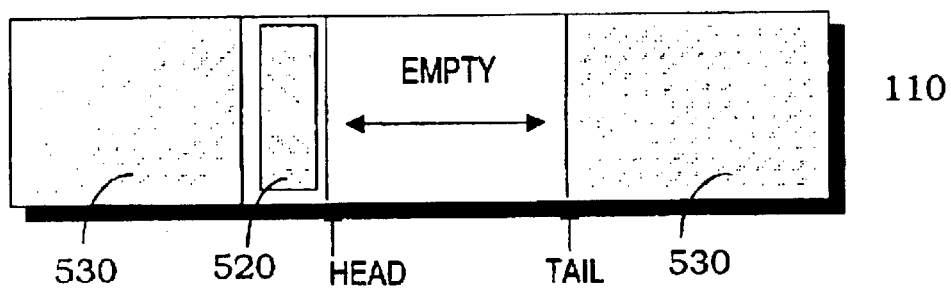

Alternatively, a deterministic latency packet may arrive when the bypass buffer is in "hold mode". When this occurs, hold counter 195 is decremented for as long as "hold mode" is active. Typically, during this period the transmit buffer is transferring binary digital signals to the ringlet; however, the transmit buffer logic is such that it will not attempt to transmit a sequence of binary digital signals or bits having a length greater than the bypass buffer is able to absorb. Otherwise, the bypass buffer might overflow while the transmit buffer is transferring binary digital signals to the ringlet. This logic may be implemented any number of ways and the invention is not limited in scope to a particular technique; however, one convenient technique is for the transmit buffer to wait until the bypass buffer is empty and for the transmit buffer to transmit sequences of binary digital signals having a length no greater than the size of the bypass buffer. Eventually, the bypass buffer will switch to "flow-through mode". At that time, the hold counter stops decrementing in this mode. The end of hold mode is illustrated in FIG. 5A. As illustrated in FIG. 5A, bypass buffer 110 includes old packets 510 to be transmitted, deterministic latency packet 520, and new packets that have arrived after deterministic latency packet 520, designated 530 in FIG. 5A. Likewise, a portion of the bypass buffer may be empty, as illustrated. Flow-through mode is illustrated in FIG. 5B. In FIG. 5B, in comparison with FIG. 5A, the number of packets 510 is reduced because several have been transferred to the ringlet. Eventually, the head pointer for the bypass buffer reaches the beginning of deterministic latency packet 520. If hold counter 195 has not been decremented to zero, than the bypass buffer is now put in "hold mode". This is illustrated in FIG. 5C. When in "hold mode", hold counter 195 is further decremented. When the count in hold counter 195 is reduced to zero, the bypass buffer is put back into "flow-through mode", allowing the deterministic latency packet to be transmitted. This is illustrated in FIG. 5D. Likewise, as illustrated in FIG. 5D and in FIG. 5C, during this period additional packets 530 have arrived and have been stored in the bypass buffer. Once the deterministic latency packet is transmitted, it will have achieved a fixed latency, as desired. Therefore, a deterministic latency packet is retained in the bypass buffer for a predetermined amount of time regardless of the number of binary digital signals stored in the bypass buffer or stored in the transmit buffer at the time the packet arrives. In FIG. 5D, the buffer is not illustrated as full because in this example it is assumed that packet signals are not received during each pulse of the hold counter, although other results are possible.

Figure 6:
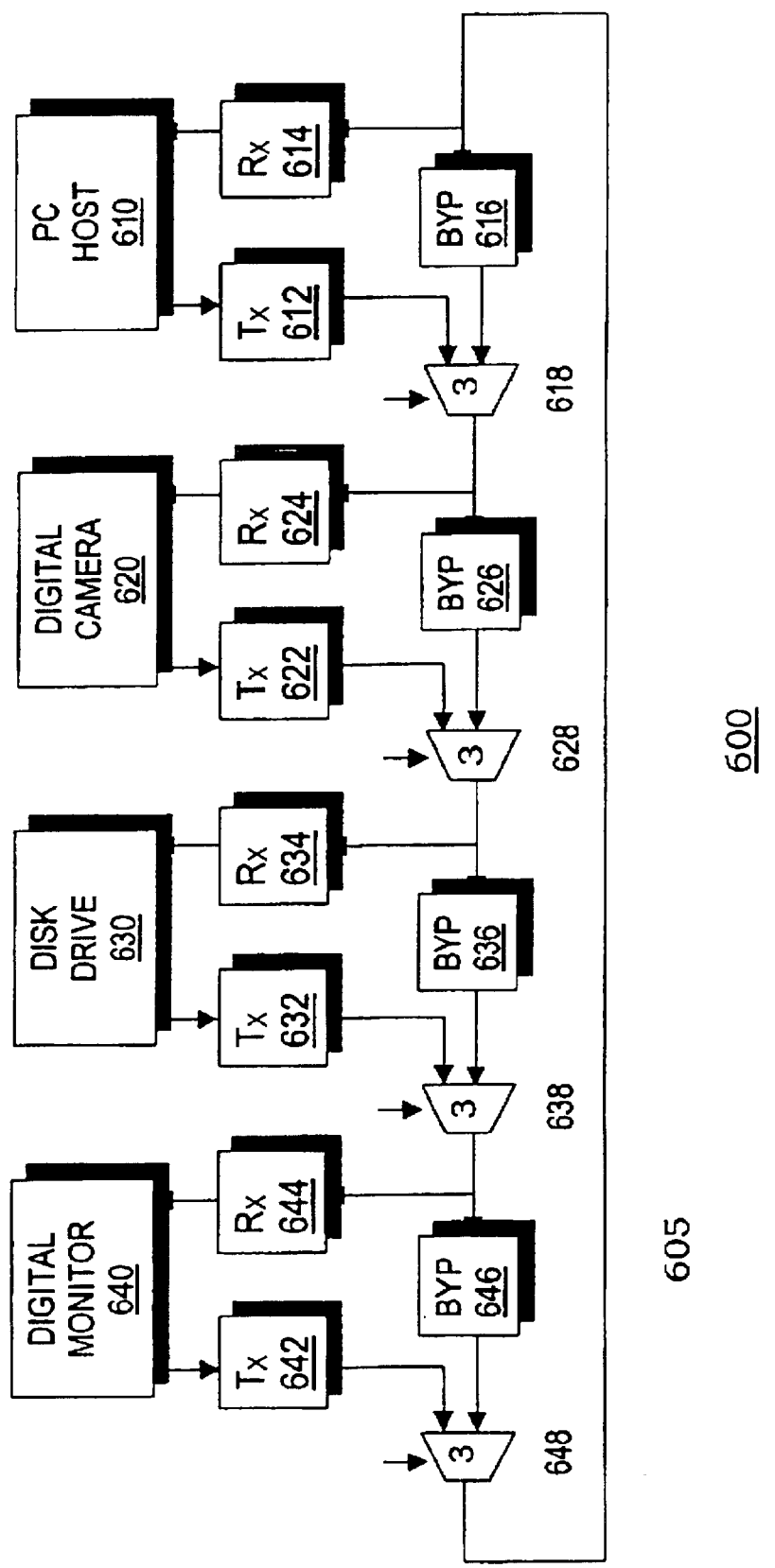
FIG. 6 is a schematic diagram illustrating one example of the application of an embodiment of an apparatus for transferring deterministic latency packets in a ringlet in accordance with the invention.

FIG. 6 is a schematic diagram illustrating an embodiment 600 of a ringlet that may employ an embodiment of an apparatus for transferring deterministic latency packets in a ringlet in accordance with the present invention. In this embodiment, four nodes are illustrated, although the invention is not restricted in scope in this respect or to these specific nodes. Illustrated is a digital monitor 640, a disk drive 630, a digital camera 620, and a PC host 610. Likewise, each node includes a receive buffer, such as 644, 634, 624, and 614, a transmit buffer, such as 642, 632, 622, and 612, a bypass buffer, such as 646, 636, 626, and 616, and MUXes, such as 648, 638, 628, and 618. As will be appreciated by one of ordinary skill in the art, some aspects of this embodiment of an apparatus for transferring deterministic latency packets in a ringlet are omitted so as not to obscure the present invention.

In this embodiment, assume that digital camera 620 is writing or transmitting binary digital signals to digital monitor 640 via ringlet 605. Also, assume that disk drive 630 is reading data or receiving binary digital signals from the host memory of PC host 610. Without the benefit of an embodiment in accordance with the present invention, the digital camera writing to the digital monitor may create uncertainty regarding the latency from the PC host to the disk drive due to the presence of bypass buffers, such as 616, 626, 636 and 646.

However, if alternatively the binary digital signals being transmitted from PC host 610 to disk 630 were indicated to be deterministic latency packets, this uncertainty would be removed. Typically, a way this process might occur is that an application executing on PC host 610 might signal that it will execute the operation of storing information on disk 630. Therefore, PC host 610 would then interrupt the operation of disk 630. Disk 630 would fetch a command from PC host 610 for reading data in the form of binary digital signals from host memory. In this particular embodiment, disk 630 would prepare for execution of the command by beginning to move the disk head to a desired position on the platter. In order to ensure that there is data in the form of binary digital signals to place on the platter when the disk head is in the desired position, the disk drive will assume the worst case, deterministic latency and predictively execute the first such command for reading data signals sufficiently in advance of receiving the data signals so that the first data signals will arrive just as the head is in position. No buffering of the data signals is employed and the data signals may immediately be written to the disk platter. Such a process may occur successfully, at least in part, because the time it takes for a request to make it to the host PC and for the first data signals to be transmitted to the disk drive is predictively deterministic in accordance with an embodiment of the present invention.

Figure 7:
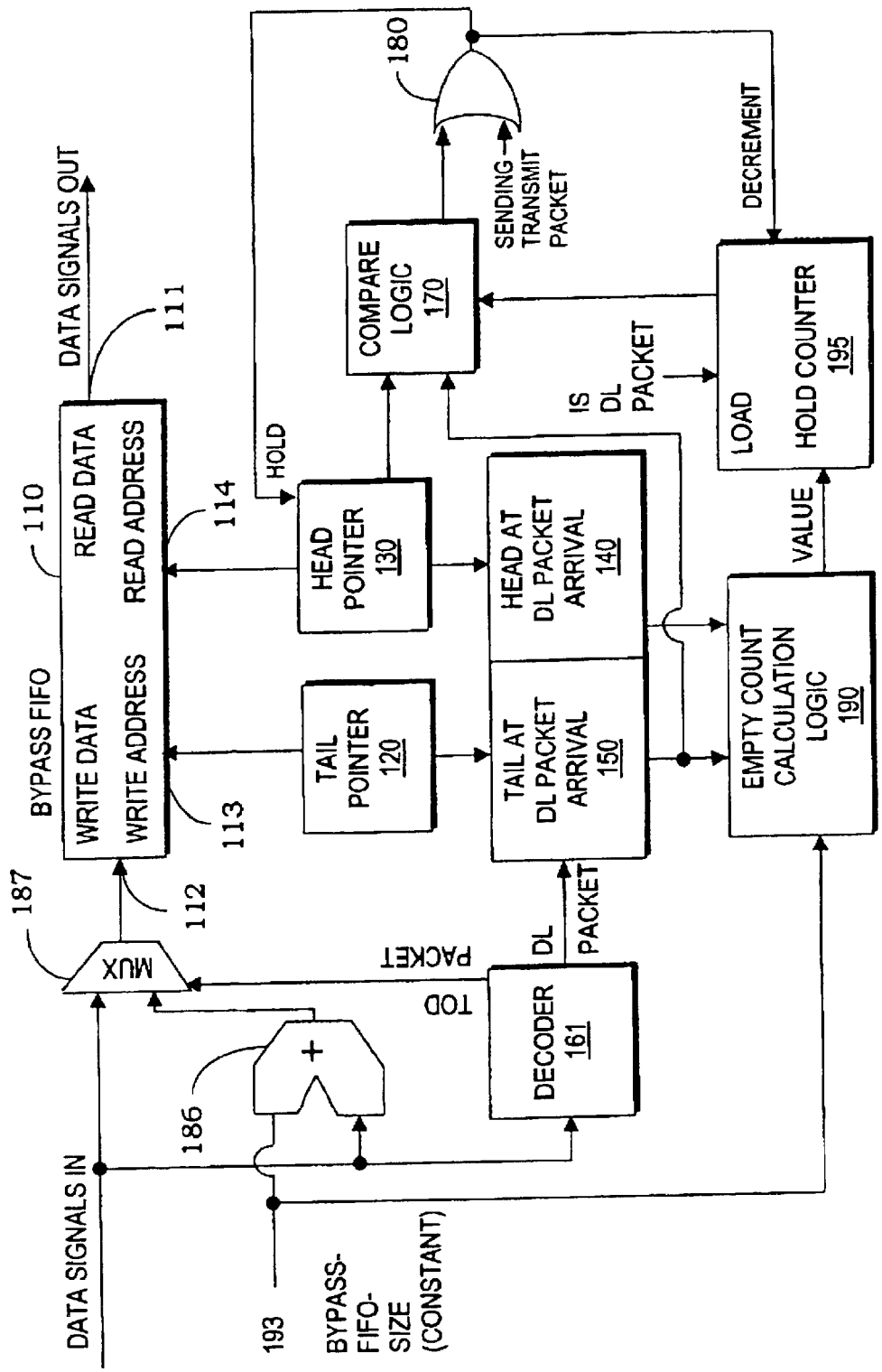
FIG. 7 is a schematic diagram illustrating another embodiment of an apparatus for transferring deterministic latency packets in a ringlet in accordance with the invention.

FIG. 7 is a schematic diagram illustrating another embodiment of an apparatus for transferring deterministic latency packets in a ringlet in accordance with the invention. This figure illustrates an embodiment in accordance with the invention for distributing a global time-of-day value across a ringlet system. As previously indicated, IEEE standard 1212 has each device or node measure how long the time-of-day information took to get through the node and update the time-of-day value to reflect this delay. For an embodiment in accordance with the invention, no measurement is employed because the delay through the node will be a fixed, known value.

For example, without intending to limit the scope of the present invention, a ringlet may employ the "cycle-start packet" format described in the previously referenced "Serial Express—A Scaleable Gigabit Extension to Serial Ringlet," Sections 1.10.6 and 4.7.1. These packets are employed to synchronize isochronous timers and for calibrating cumulative through-chip delays. Therefore, in this context, a cycle-start packet may be a type of deterministic latency packet. Whereas nodes would typically measure their cycle-start packet pass-through delay so that the time-of-day value within the cycle-start packet may be properly compensated, instead FIG. 7 illustrates an embodiment in which no measurement is employed.

The embodiment illustrated in FIG. 7 operates in a manner similar to the embodiment illustrated in FIG. 1. However, this particular embodiment includes features to address handling a global time-of-day value that may be included in a deterministic latency packet. For example, as discussed with respect to FIG. 1, decoder 160 receives arriving binary digital signals and determines whether those signals are packets with a deterministic latency. For the embodiment illustrated in FIG. 7, decoder 161 determines whether the packet is a packet with a deterministic latency that has a time-of-day (TOD) field, such as a cycle-start packet, for example. In this particular embodiment, adder 186 adds BYPASS-FIFO-SIZE-193, a constant signal equal to the latency of the deterministic latency packet through the bypass buffer, to the time-of-day field value. Likewise, multiplexer (MUX) 187 controls whether to write the original binary digital signals into the bypass buffer or whether to write the binary digital signals with the modified time-of-day field.

An embodiment of a method for transferring deterministic latency packets in a ringlet in accordance with the invention may be accomplished as follows. A bypass buffer, such as buffer 110 in FIG. 1, for example, may be coupled to a ringlet. A deterministic latency packet of binary digital signals on the ringlet may be written into the bypass buffer. The deterministic latency packet of binary digital signals in the bypass buffer may be retained in the bypass buffer for a predetermined amount of time, such as by using the embodiment illustrated in FIG. 1 and previously described. As previously described, the predetermined amount of time may be related to the number of memory locations for the bypass buffer, although the invention is not limited in scope in this respect.

As previously described, for the embodiment illustrated in FIG. 1, for example, the bypass buffer may have a hold mode and a flow-though mode. Therefore, writing a deterministic latency packet into the bypass buffer may occur during the hold mode or the flow-through mode. For this particular embodiment, the deterministic latency packet is written into the bypass buffer at the next available memory location after any contents of the bypass buffer, although the invention is not limited in scope in this respect.

At the time a deterministic latency packet arrives at the bypass buffer, the bypass buffer may have signal contents and a number of empty memory locations. In this context, an "empty memory location" refers to a memory location that does not contain useful data in the form of a binary digital signal or bit to be transferred to the ringlet or elsewhere in the node. If the bypass buffer has signal contents, the contents have a head location and a tail location, such as previously illustrated in connection with the embodiment illustrated in FIG. 1. When the bypass buffer has no contents, appropriate flags or signals (not shown) will typically be set.

As previously indicated, in this particular embodiment, the deterministic latency packet of binary digital signals is retained in the bypass buffer for a predetermined amount of time. For example, the deterministic latency packet is advanced in the bypass buffer on each clock cycle of a synchronizing clock until the deterministic latency packet is located at the head location for the contents of the bypass buffer. The deterministic latency packet is held at the head location for a time period related to the number of empty memory locations in the bypass buffer at the time the deterministic latency packet arrived. For this particular embodiment, the time period corresponds to a clock cycle for each location of the empty locations. If the deterministic latency packet includes a time-of-day field for a time-of-day signal then a fixed signal amount corresponding to the predetermined amount of time is added to the time-of-day signal in the time-of-day field.

While certain features of the invention have been illustrated and described herein, many modifications, substitutions, changes and equivalents will now occur to those skilled in the art. For example, in an alternative embodiment, more than one DL packet may be received and held in a bypass buffer. One way to implement this may include storing received nonpacket signals, such as idles, for example, in the bypass buffer between valid packets. It is, therefore, to be understood that the appended claims are intended to cover all such modifications and changes as fall within the true spirit of the invention.

What is claimed is:

1. A method of using a bypass buffer in a node coupled to a ringlet comprising:

writing a packet of binary digital signals on said ringlet into said bypass buffer;

determining a delay time for said packet of binary digital signals based, at least in part, on a number of binary digital signals already stored in said bypass buffer at a time said packet of binary digital signals is written into said bypass buffer; and delaying said packet of binary digital signals in said bypass buffer for said delay time before transferring said packet of binary digital signals to said ringlet.

2. The method of claim 1, wherein said delay time is related at least in part to a number of memory locations for said bypass buffer.

3. The method of claim 1, wherein said packet of binary digital signals comprises a deterministic latency packet.

4. A node to be coupled to a ringlet comprising:

a transmit buffer and a receive buffer;

said transmit buffer and receive buffers being coupled in a configuration to transfer binary digital signals between said node and said ringlet via said transmit and receive buffers;

said configuration further including a bypass buffer to temporarily queue binary digital signals passing through said node; and said bypass buffer further being coupled in said configuration to delay a packet of binary digital signals for a delay time before transferring said packet of binary digital signals to said ringlet, said delay time based, at least in part, on a determination of a number of binary digital signals already queued in said bypass buffer at a time said packet of binary digital signals is written into said bypass buffer.

5. The node of claim 4, wherein said of delay time is related at least in part to a number of memory locations in said bypass buffer.

6. The node of claim 4, wherein said packet of binary digital signals comprises a deterministic latency packet.

7. A node to be coupled to a ringlet comprising:

a bypass buffer;

said bypass buffer being able to be coupled to said ringlet to temporarily queue data signals from said ringlet;

digital logic circuitry coupled to said bypass buffer including a head pointer for said bypass buffer; and said bypass buffer being coupled to said head pointer to delay transferring to said ringlet a packet of data signals for a delay time before transferring said packet of data signals to said ringlet, said delay time based, at least in part, on a determination of a number of digital signals already stored in said bypass buffer at a time said packet of data signals is written into said bypass buffer.

8. The node of claim 7, wherein said digital logic circuitry includes a tail pointer for said bypass buffer;

said bypass buffer being further coupled to said tail pointer to delay a packet of data signals for a delay time based, at least in part, upon a location indicated by said tail pointer and a location indicated by said head pointer at a time the said packet of data signals is written into said bypass buffer.

9. The node of claim 8, wherein said delay time is related at least in part to a number of memory locations in said bypass buffer.

10. The node of claim 8, wherein said packet of data signals comprises a deterministic latency packet.

11. The method of claim 2, wherein said delay time is further related at least in part to a number of empty memory locations in said bypass buffer at said time said packet of binary digital signals is written into said bypass buffer.

12. The node of claim 5, wherein said delay time is related at least in part to a number of empty memory locations in said bypass buffer at said time said packet of data signals is written into said bypass buffer.

13. The node of claim 9, wherein said period of delay time is related at least in part to a number of empty memory locations in said bypass buffer at a time said packet is written into said bypass buffer.

* * * * *

UNITED STATES PATENT AND TRADEMARK OFFICE
CERTIFICATE OF CORRECTION

PATENT NO.     : 6,816,504 B1                                    Page 1 of 1
DATED          : November 9, 2004
INVENTOR(S)    : Erickson It is certified that error appears in the above-identified patent and that said Letters Patent is hereby corrected as shown below:

Column 12,
Line 47, after "said", delete "period of".

Signed and Sealed this

Fifth Day of July, 2005

JON W. DUDAS
*Director of the United States Patent and Trademark Office*